United States Patent
Waagen et al.

(10) Patent No.: US 8,337,405 B2
(45) Date of Patent: Dec. 25, 2012

(54) SYSTEM AND METHOD FOR AUTOMATIC DETECTION OF ANOMALIES IN IMAGES

(75) Inventors: Donald E. Waagen, Tucson, AZ (US); Estille Whittenberger, Tucson, AZ (US); John S. Costello, Seattle, WA (US)

(73) Assignee: Raytheon Company, Waltham, MA (US)

( * ) Notice: Subject to any disclaimer, the term of this patent is extended or adjusted under 35 U.S.C. 154(b) by 1234 days.

(21) Appl. No.: 12/135,797

(22) Filed: Jun. 9, 2008

(65) Prior Publication Data

US 2009/0209833 A1   Aug. 20, 2009

Related U.S. Application Data

(60) Provisional application No. 60/943,012, filed on Jun. 8, 2007.

(51) Int. Cl.
*A61B 6/00* (2006.01)
*G06K 9/68* (2006.01)

(52) U.S. Cl. ........................................ 600/306; 382/218

(58) Field of Classification Search ........................ None
See application file for complete search history.

(56) References Cited

U.S. PATENT DOCUMENTS

| | | | | |
|---|---|---|---|---|
| 6,297,825 | B1 * | 10/2001 | Madden et al. | 345/419 |
| 7,466,848 | B2 * | 12/2008 | Metaxas et al. | 382/128 |
| 2010/0158330 | A1 * | 6/2010 | Guissin et al. | 382/128 |

OTHER PUBLICATIONS

"The Visualization Toolkit, An Object-Oriented Approach to 3D Graphics," 3rd edition, ISBN 1-930934-12-2, chapter 10, pp. 369-384.
Horn et al., "Determining Optical Flow," Massachusetts Institute of Technology Artificial Intelligence Laboratory, Apr. 1980, pp. 1-27.

* cited by examiner

*Primary Examiner* — Shanon A Foley
(74) *Attorney, Agent, or Firm* — Schwegman Lundberg & Woessner, P.A.

(57) ABSTRACT

Methods and apparatus for detecting anomalies in images according to various aspects of the present invention operate in conjunction with an optical flow system. The optical flow system may receive image data for a first image and a second image and generate flow vectors corresponding to differences between the first image and the second image. An analyzer may be coupled to the optical flow system and analyze the flow vectors to identify anomalies in the second image.

13 Claims, 4 Drawing Sheets

SYSTEM AND METHOD FOR AUTOMATIC DETECTION OF ANOMALIES IN IMAGES

CROSS-REFERENCES TO RELATED APPLICATIONS

This application claims the benefit of U.S. Provisional Patent Application No. 60/943,012, filed Jun. 8, 2007, and incorporates the disclosure of such application by reference.

BACKGROUND OF THE INVENTION

Skin cancer screening may involve the evaluation of features on the surface of the skin such as moles, growths, and/or lesions over time. The assessment of changes to the skin features may include identifying the presence of new features, the absence of old features, and/or changes to the physical characteristics of existing features. These changes may indicate that the skin features are cancerous. Identifying changes to the skin surface features may allow physicians to detect cancerous growths before the development of metastatic disease.

Skin cancer screening is a time consuming process for physicians. The skin must be examined closely and the physician may record descriptions such as the location, color, shape, and/or size of suspect features on the skin. A patient will often return for a second physician evaluation several months later to determine whether the suspect features have changed over time. Comparing written notes describing skin features at a previous time has a limited utility to a physician. For example, it may be difficult to accurately determine a potential change in skin features based on such written descriptions.

The development of automated skin imaging technologies has similar problems with reliability. Traditional imaging systems use affine image registration algorithms to detect anomalies in skin composition. To detect anomalies, these imaging systems rely on the linear alignment of images of the skin that are taken at different times. Misalignment of the images is prevalent in traditional imaging systems due to the nonlinear nature of patient skin composition. For example, a patient may gain or lose a significant amount of weight during the several months in between physician appointments, causing inconsistencies in the characteristics of the skin surface area over time.

The linear nature of affine image registration leads to a lack of operational fidelity. Affine image registration causes misdiagnosis including false-positives in which features are erroneously determined to be new skin features. Misdiagnosis also occurs as false-negatives in which pre-existing skin features are erroneously declared absent. The high rate of misdiagnosis in the form of false-positives and false-negatives requires a physician or other user of the imaging system to manually re-evaluate each anomalous skin feature that is identified by the imaging system. This effect defeats the purpose of automating a skin imaging system and prevents the system from being a viable and clinically useful tool for physicians.

SUMMARY OF THE INVENTION

Methods and apparatus for detecting anomalies in images according to various aspects of the present invention operate in conjunction with an optical flow system. The optical flow system may receive image data for a first image and a second image and generate flow vectors corresponding to differences between the first image and the second image. An analyzer may be coupled to the optical flow system and analyze the flow vectors to identify anomalies in the second image.

BRIEF DESCRIPTION OF THE DRAWINGS

A more complete understanding of the present invention may be derived by referring to the detailed description and claims when considered in connection with the following illustrative figures, which may not be to scale. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of techniques, technologies, and methods configured to perform the specified functions and achieve the various results. For example, the present invention may employ various processors, electronics, algorithms, processes, cameras, imaging systems, storage systems, statistical processing elements, memory elements, photo sensors, communication elements, processing elements, and the like, which may carry out a variety of functions. In addition, the present invention may be practiced in conjunction with any number of devices, and the systems described are merely exemplary applications. Further, the present invention may employ any number of conventional techniques for image acquisition, image registration, data analysis, component interlacing, data processing, and the like.

The ensuing description provides exemplary embodiments only, and is not intended to limit the scope, applicability or configuration of the invention. Instead, the ensuing description of exemplary embodiments provides an enabling description for implementing an exemplary embodiment of the invention. Various changes may be made in the function and arrangement of elements without departing from the spirit and scope of the invention as set forth in the appended claims.

Specific details are given in the following description to provide a thorough understanding of the embodiments. The embodiments may be practiced, however, without these specific details. For example, circuits may be shown in block diagrams to avoid obscuring the embodiments in unnecessary detail. Likewise, well-known circuits, structures, and techniques may be shown without unnecessary detail to avoid obscuring the embodiments.

Further, embodiments may be described as a process which is depicted as a flowchart, flow diagram, data flow diagram, structure diagram, or block diagram. Although such illustrations may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a medium, such as portable or fixed storage devices, optical storage devices, wireless channels and various other media capable of storing, containing or carrying instructions and/or data, and a processor may perform the necessary tasks. A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable technique or mechanism including memory sharing, message passing, token passing, network transmission, etc.

Figure 1:
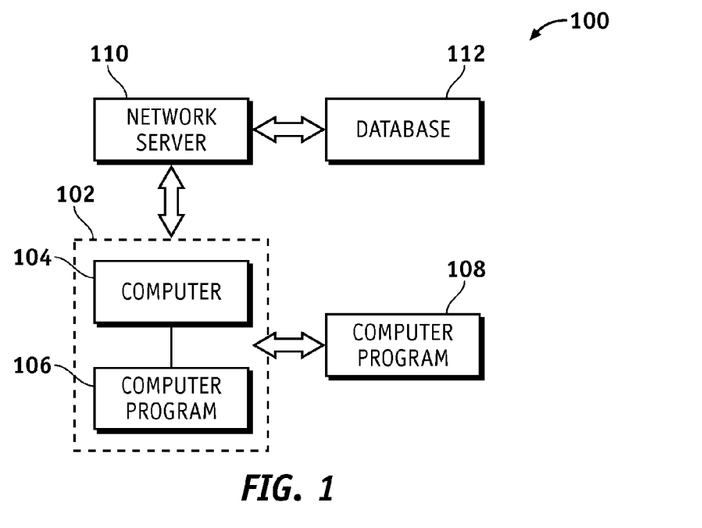
FIG. 1 is a block diagram of a detection system according to various aspects of the present invention and possible associated functional components.

Methods and apparatus according to various aspects of the present invention may be applied to any system for the detection of anomalies in data. Certain representative implementations may include, for example, anomaly screening and/or detection techniques such as for skin cancer detection, astronomy, quality control for manufacturing, and/or other systems or fields involving comparing data, images, and/or samples. In one embodiment, methods and apparatus for detecting anomalies according to various aspects of the present invention may operate in conjunction with a dermatological anomaly detection system 100 to identify differences in images of a patient's skin.

Methods and apparatus according to various aspects of the present invention may be embodied as a method, a system, a device, and/or a computer program product. Accordingly, such apparatus and methods may take the form of an entirely software embodiment, an entirely hardware embodiment, or an embodiment combining aspects of both software and hardware. The present invention may also comprise a computer program product on a computer-readable storage medium having computer-readable program code embodied in the storage medium. Any suitable computer-readable storage medium may be utilized, including hard disks, CD-ROM, optical storage devices, magnetic storage devices, USB memory keys, and/or the like.

Referring now to FIG. 1, a detection system 100 according to various aspects of the present invention may operate in conjunction with a computer system 102. The computer system 102 may comprise a separate computer 104, such as a personal computer and/or a workstation. The computer system 102 may be coupled to or otherwise operate in conjunction with an imaging system 108, such as via a direct connection, a network connection, or integration into a single unit. The computer system 102 may execute a computer program 106, which causes the computer 104 to perform various processes and functions. The computer 104 may be omitted from or integrated into other components of the detection system 100, and various functions may be performed by other components, such as by the imaging system 108 or elements connected to a network, such as a server 110 and/or a database 112.

The computer system 102 may operate in conjunction with the imaging system 108 and/or may receive and/or store data from the imaging system 108. The computer system 102 may receive data from the imaging system 108 through any system for exchanging data, such as, for example, the Internet, an intranet, an extranet, WAN, LAN, satellite communications, intermediate storage systems, and/or other suitable mechanisms. The computer system 102 may also instruct and/or program the imaging system 108, analyze image data, and/or function independently of the imaging system 108.

The imaging system 108 provides image data to the computer system 102 for analysis. The imaging system 108 may comprise any suitable system for generating, retrieving, and/or otherwise providing images to the computer system 102, and may provide any appropriate images. For example, the imaging system 108 may comprise a system for generating image data corresponding to a scene and storing the image data, such as a camera, medical imaging machines such as CAT scanners or nuclear magnetic resonance imaging machines, microscopy and/or endoscopy imaging equipment, astronomical surveying equipment, and satellite and/or aerial photography systems.

The imaging system 108 may further comprise various components for memory, function, and/or communication, such as digital memory, components to control functions such as focus and resolution, and any components for communication of the camera to the computer system 102. The imaging system 108 may store image data comprising the characteristics and/or properties of the image subject such as the image's color, brightness, contrast, shape, dimensions, and/or the like. The imaging system 108 may further process the image data, such as to enhance images, compress data, convert to grayscale, or other functions. In the present embodiment, the imaging system 108 may comprise a digital camera connected to the computer system 102 through any system for exchanging data. Alternatively, the imaging system 108 may comprise a medium containing images for processing by the computer system 102. For example, imaging system 108 may comprise a database containing images that may be accessed by the computer system 102 for analysis.

In the present embodiment, the computer 104 is adapted to receive image data for multiple images and compare the images to identify differences between them. For example, the computer 104 may receive images of a patient's skin taken at different times, such as over a period of months. The computer 104 may be further adapted to register the images and compare the images for differences, for example to identify new or changing skin conditions.

The computer 104 may register or align the images in any appropriate manner. For example, the computer 104 may align the images by applying a coarse registration module and a fine registration module. The coarse registration process approximately aligns the images for comparison. The fine registration process refines the registration of the images. The images may be aligned, however, in any suitable manner to facilitate comparison of the images. For example, the coarse and fine image registration modules may apply area-based and/or feature-based image registration techniques, linear transformations and/or non-rigid transformations, search-based and/or direct methods, spatial-domain techniques, frequency-domain techniques, and/or other suitable image registration processes.

In the present embodiment, the coarse registration module may comprise any appropriate technique, process, or system for approximately aligning the images, such as conventional image alignment techniques. In the present embodiment, the coarse registration module comprises a coarse registration software routine executed by the computer 104. The coarse registration routine may implement an automatic process for image registration, such as a conventional linear transformation.

Figure 2:
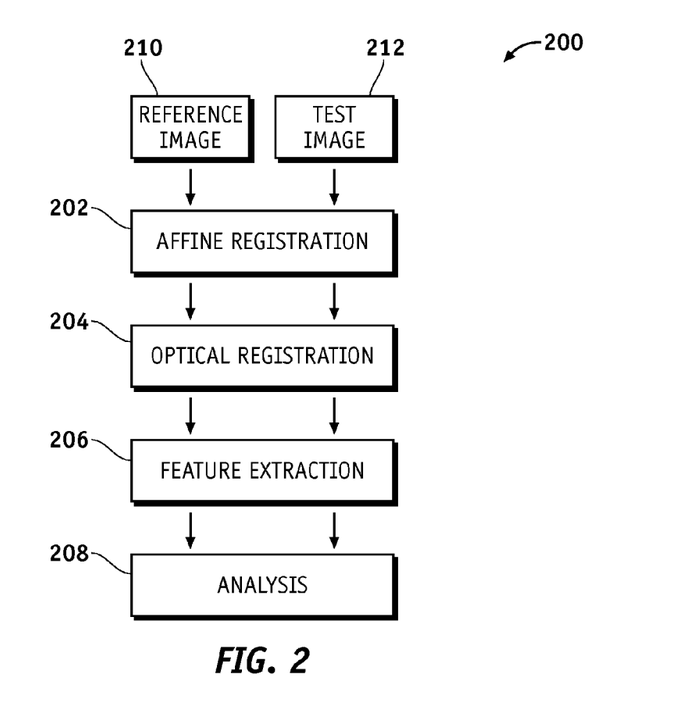
FIG. 2 is a flow diagram of the generation and analysis of image registration data.

In one embodiment, referring to FIG. 2, the coarse registration module performs an affine registration 202 process in which at least two images are aligned with each other according to various linear transformations. The affine registration 202 may comprise any system for performing the alignment through linear transformations of a test image 212 with respect to a reference image 210. For example, the affine registration 202 of the test image 212 may comprise a class of linear 2-D geometric transformations in which the test image 212 is aligned through translation, rotation, and scaling of the test image 212 relative to the reference image 210 space. In the alternative, the reference image 210 may be aligned to the test image 212 space through the geometric transformations. Alternatively, the coarse registration module may perform other registration processes, such as 3-D geometric transformations or other registration processes.

Affine registration of the test image 212 or the reference image 210 may comprise mapping the pixel values located at a particular position $(x_1, y_1)$ in the test image 212 into positions $(x_2, y_2)$ in the reference image 210, for example according to the pixel intensity values. Generally, the mapping of pixel intensity values may be performed by applying a linear combination of operations such as translation, rotation, scaling. The translation operation comprises laterally and/or longitudinally shifting the test image 212 and/or components of the test image 212 to a different location within the affine registered test image 212 to match the position of the reference image 210. The rotation operation comprises shifting the test image 212 and/or components of the test image 212 clockwise or counterclockwise to match the orientation of the reference image 210. The scaling operation comprises enlarging and/or diminishing the test image 212 and/or components of the test image 212 to match the dimensions of the reference image 210. The linear geometric transformations of affine registration 202 may further comprise operations such as shearing, squeezing, and projection.

Affine registration 202 of the test image 212 may allow mapping the corner coordinates of the test image 212 to arbitrary new coordinates in the resulting affine registered test image 212. Once the transformation has been defined, the pixels of the test image 212 may be re-mapped by calculating, for each resulting affine registered test image 212 pixel location $(x_2, y_2)$, the corresponding input coordinates $(x_1, y_1)$. This process may result in the shift of the test image 212 according to a single transformation value obtained by the affine registration of the test image 212. The reference image 210 and/or the test image 212 may further be cropped to comprise the common areas of both images.

The fine registration module may comprise any appropriate technique, process, or system for refining the alignment of the images. In the present embodiment, the fine registration module comprises a fine registration software routine executed by the computer 104. The fine registration routine may implement an automatic process for image registration, such as an optical flow registration process 204 and/or other fine registration routines such as finite element analysis techniques.

In the present embodiment, the fine registration routine may comprise the optical flow registration 204 in which an optical flow between at least two images is determined. Generally, the optical flow registration 204 may extract pixel motion across an image plane. Algorithms used in optical flow registration 204 calculate an optical flow field from the test image 212 in relation to the reference image 210, which establishes correlations and highlights differences between the images. In one embodiment, algorithms used in optical flow registration may be allowed to overfit the data from the optical flow registration 204. Significant differences between the optical flow field between the test image 212 and the reference image 210 may be identified as anomalous regions according to overfitting or otherwise incorrectly calculating the optical flow field 300. Because the two images are presumed to be identical, the optical flow determination identifies either misalignment of pixels between the images, which may be corrected by fine adjustment of the alignment of the images, or differences between the images.

Figure 3:
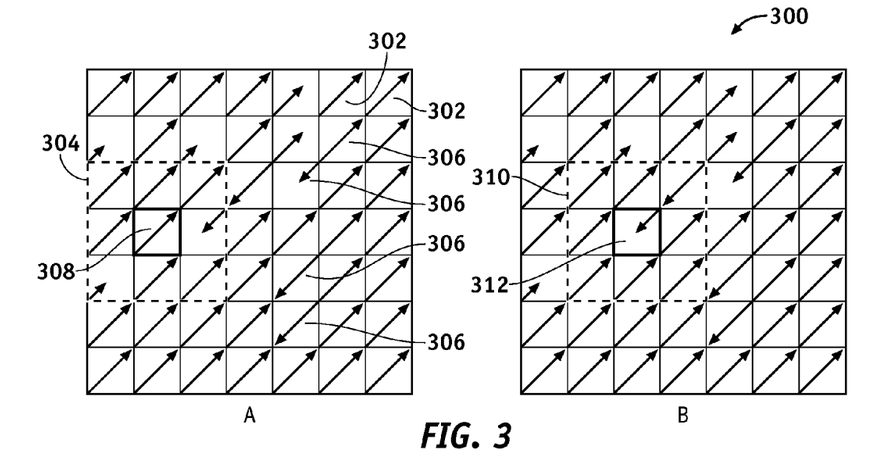
FIGS. 3A-B are illustrations of flow vector data.

The optical flow registration 204 module may operate in conjunction with any suitable system for identifying optical flow, such as phase correlation, block-based methods, and/or differential methods. Referring now to FIG. 3, the optical flow registration module may generate an optical flow field 300 comprising a set of flow vectors 302 corresponding to apparent displacement of pixels between the between the test image 212 and the reference image 210. The flow vectors may signify where each pixel or region in the reference image 210 has apparently moved in the test image 212. For example, the movement may be represented as a flow vector 302 originating at a pixel in the reference image 210 and terminating at a pixel in the test image 212.

The image data may be analyzed to identify anomalies, such as by identifying differences between the images. Anomalies between the reference image 210 and test image 212 may appear as an abnormal warping of the optical flow field 300. In the present embodiment, the computer system 102 executes an image comparison module to identify the differences between the registered images. The image comparison module may identify the differences in any appropriate manner, such as by comparing the image data and/or data derived from the image data. In the present embodiment, the image comparison module may identify anomalies by distinguishing flow vectors 302 and analyzing statistics for measuring the uniformity of flow vectors 302. For example, referring again to FIG. 2, the image comparison module may include a feature extraction 206 to determine features in the data and an analysis module 208 to analyze the features.

The flow vectors 302 may be distinguished in any appropriate manner. In one embodiment, for each pixel in the optical flow field 300, a feature extraction module 206 applies a local window 304 to a set of pixels to calculate a set of pixel-associated features, such as first and second order statistics, that measure or relate the uniformity of the local flow across the pixels in the window. The window may comprise any appropriate shape and size, and multiple iterations over the optical flow field 300 may be performed with different sizes and shapes of windows.

For each pixel, the window defines a set of flow vectors 302 from which the statistics may be calculated. For example, referring to FIG. 3A, the pixel-associated features of pixel 308 may be calculated using local window 304 that is 3×3 pixels. Similarly, referring to FIG. 3B, the pixel-associated features of the next pixel 312 may be calculated using local window 310. The calculation of the pixel-associated features 206 may proceed across the optical flow field 300 until all pixels have been analyzed.

The feature extraction module 206 may calculate any suitable statistics for measuring the uniformity of the local flow across the pixels in the window or otherwise determining the presence of anomalies. For example, the feature extraction module 206 may calculate the mean magnitude, median magnitude, standard deviation of magnitudes, mean direction, median direction, standard deviation of direction, which may characterize the flow vectors 302 within the window. In one embodiment, the flow value $v_{i,j}$ at pixel [i,j] corresponds to a vector quantity, that is, $v_{i,j}=[\Delta x_{i,j}, \Delta y_{i,j}]$. This value may define the changes between the corresponding image pixels. One type of pixel-associated feature is the sum of the flow vectors 302 over the local window using vector addition, such as for a 5×5 pixel window, $$f_{i,j} = \sum_{k=-2}^{2} \sum_{m=-2}^{2} v_{i+k,j+m}$$

A second type of pixel-associated feature is the sum of the magnitudes of the flow vectors 302 in the local window, $$g_{i,j} = \sum_{k=-2}^{2} \sum_{m=-2}^{2} \|v_{i+k,j+m}\|$$

Finally, the magnitude of $f_{i,j}$ may be subtracted from $g_{i,j}$ for all pixels in the window, $$d_{i,j} = g_{i,j} - \|f_{i,j}\|.$$

These statistics produce differing statistics for uniform and anomalous regions of local flow across the pixels. Uniform regions may have values near zero, while anomalous regions tend to exhibit much larger values, such as up to the number of pixels defined by the local window (25 for the 5×5 pixel window).

The $d_{i,j}$ statistical values may be sorted to determine whether the value corresponds to an anomalous condition. In one embodiment, the analysis module 208 sorts the statistical values according to whether the statistical values surpass one or more thresholds. For example, small values may correspond to incomplete registration of the images such that the pixels in the test image are slightly displaced from corresponding pixels in the reference image. Conversely, large values may correspond to actual differences in the images and may be noted as anomalies.

The thresholds may be selected according to any appropriate criteria. The thresholds may comprise static thresholds or may be dynamic, such as thresholds generated according to the vector data. For example, the thresholds may be calculated according to a standard deviation based on the vector data, or a multiple or fraction of the standard deviation. The thresholds may be selected, however, according to any appropriate criteria.

In one embodiment, the analysis module 208 may compare each vector or group of vectors to surrounding vectors or vector groups to determine whether the vector magnitudes differ significantly from the magnitudes of nearby vectors. Warping of the optical flow field 300 may be represented in a particular area by significant differences in the direction and/or magnitude of flow vectors 302 within the area. The significance of the differences may be determined in absolute terms or with reference to neighboring areas. If the deviation of a vector or vector group from others in the area is small, then the deviation is more likely due to imperfect registration of the images, for example due to changes in the patient's physique, which may be corrected by the fine registration module. If the deviation is large, then the (low vectors 302 may correspond to skin-related differences in the images and may be noted as anomalies.

The image comparison module may analyze the optical flow field data in any suitable manner to identify anomalies. The image comparison module may analyze the statistics, such as by comparing the statistics to static thresholds or dynamic thresholds directly or indirectly based on the flow vectors 302, to identify anomalies. For example, pixels associated with regions exhibiting low average magnitudes and/or low standard deviations may correspond to non-skin-related anomalies, for example because the optical flow data indicates that the changes from the reference image 210 to the test image 212 are small and/or uniform. This suggests that the differences are due to displacement of the same subject matter in the images, for example due to weight gain or loss, and not a change in the subject matter. Pixels associated with regions exhibiting high average magnitudes and/or high standard deviations may correspond to skin-related anomalies, for example because the optical flow data indicates that the changes from the reference image 210 to the test image 212 are large and/or non-uniform. This suggests that the differences are not merely displacement of the same subject matter, but different subject matter altogether in the images, signifying a change in the patient's skin. The image comparison module may report the identified anomalies for review or further analysis.

Figure 4:
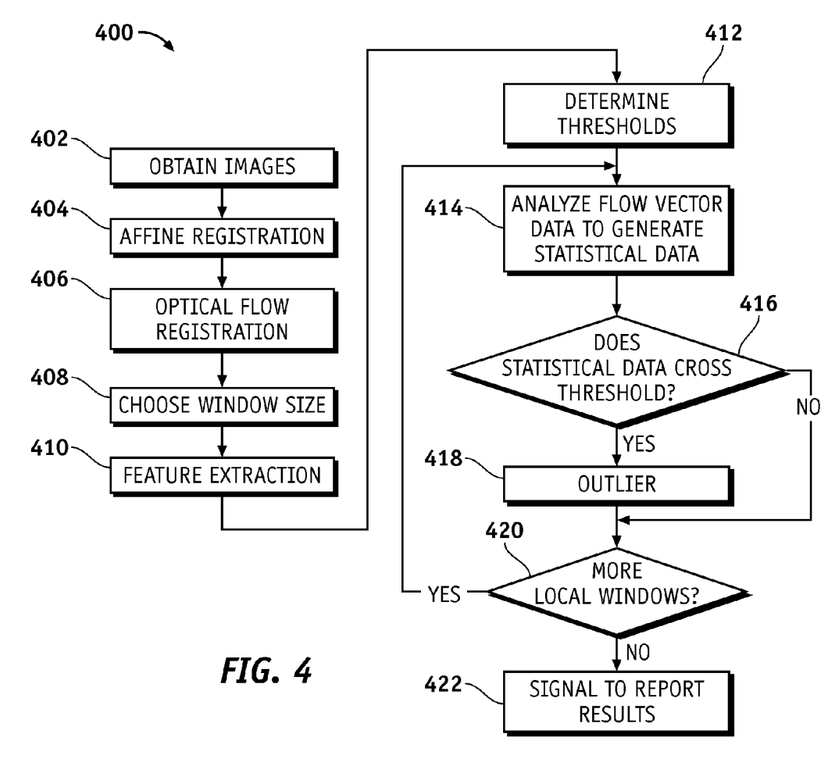
FIG. 4 is a flow diagram for identifying anomalies in flow vector data.
Figure 5:
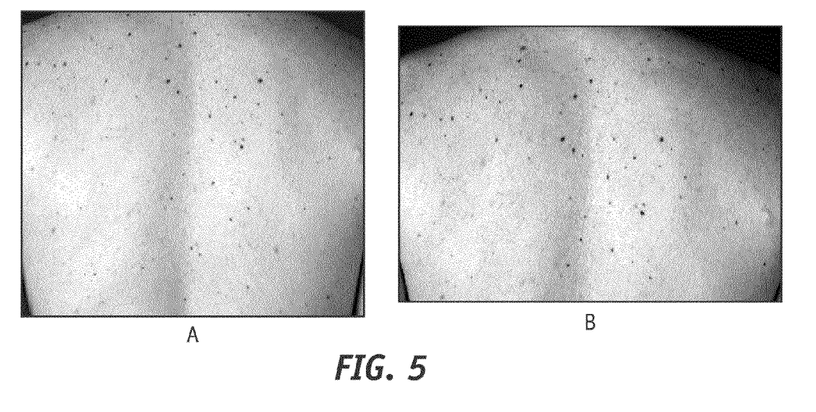
FIGS. 5A-B are a reference and test image, respectively.

In operation, referring to FIG. 4, a process for identifying anomalies according to various aspects of the present invention may comprise obtaining the images or other data for comparison. The images for comparison may comprise the reference image 210 and the test image 212 (402), as shown in FIG. 5A-B respectively, showing images of the back of a patient's upper torso. In the present embodiment, the patient may be photographed by the imaging system 108 in conjunction with a first visit, and the image may be stored as the reference image 210 (FIG. 5A). Some time later, such as several months later, the patient may be photographed by the imaging system 108 again to generate a second image, which may be stored as the test image 212 (FIG. 5B). The images 210, 212 may also be processed to facilitate analysis, such as by converting color image data to grayscale data.

The images 210, 212 are provided to the computer system 102, for example to identify differences in the patient's skin between the first visit and the second visit. The computer system 102 coarsely registers the two images, for example to approximately align the images so that differences between the images are minimized. By minimizing the differences using a coarse registration, the fine registration process and the image comparison may more accurately refine the registration of the images to compensate for changes in the body shape of the patient and identify differences in the patient's skin, such as identifying new skin features, absence of skin features, or changes in skin features.

Figure 6:
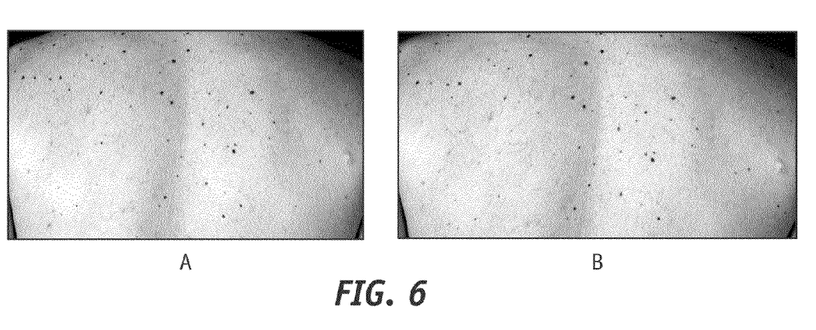
FIGS. 6A-B are the common area of the reference and test images of FIG. 5 produced by cropping the images.

In the present embodiment, referring to FIGS. 6A-B, the reference image 210 and the test image 212 may be aligned by affine registration (404). The reference image 210 and the test image 212 may also be cropped to include the common areas of the two images.

The computer system 102 may further identity differences between the two images 210, 212 to register the two images 210, 212 and identify anomalies in the test image 212. For example, the computer system 102 may execute an optical flow process to compensate for changes in the patient's physique that are not skin-related between the lime of the first image 210 and the second image 212. The optical flow data may also be analyzed to identify changes in the patient's skin between the time of the first image 210 and the second image 212.

For example, the computer system 102 may perform an optical flow process on the two images to generate the optical flow field 300 (406). The optical flow field includes flow vectors 302 corresponding to perceived movement of image elements from the reference image 210 to the test image 212. Certain flow vectors may relate to non-skin-related conditions, such as the patient's gain or loss of weight which may be compensated for via refined registration. Other flow vectors may relate to skin-related conditions, such as the development of a new skin feature (like a mole, lesion, sore, tumor, or the like), the loss of a skin feature, or a change in a skin feature, which may be reported and/or further analyzed.

To distinguish the skin-related differences from the non-skin-related differences, the present computer system 102 analyzes the optical flow field 300 data. For example, the computer system 102 may compare the magnitudes and/or directions of the flow vectors 302 for regions around each pixel in the optical flow field 300. In the present embodiment, the window may be chosen (408) for the analysis of flow vector data across the pixels of the local window 304. In one embodiment, the size of the local window 304 may be pre-selected to cover a selected area, such as a 3×3 pixel square or a 5×5 pixel square.

The window 408 may be applied to each pixel in the optical flow field 300. Statistical data for the pixels in the window are generated to characterize the flow vectors in the window. The results are stored and the window may be moved to the next pixel. The process may be repeated until all of the pixels in the optical flow field 300 have been covered.

The statistical data may be analyzed to identify areas associated with skin-related changes. In one embodiment, the statistical data for each pixel in the optical flow field 300 are compared to one or more thresholds (414). The computer system 102 may generate the thresholds in any appropriate manner, such as by retrieving the thresholds from memory, prompting a user for desired thresholds, or calculating the thresholds according to the image data, the statistical data, and/or the optical flow field 300 data (412). The thresholds may be adjusted to increase the sensitivity (e.g., reduce false negatives) of the analysis or to decrease the number of false positives. In one embodiment, if the statistical data for a particular pixel does not cross the threshold, then the analysis of the next pixel may proceed (416). The analysis of the flow vector data may also proceed concurrently for multiple pixels. If the statistical data crosses the threshold, then the location of the associated pixel may be identified as an outlier (418). The analysis of flow vector data may proceed until all statistical data for each pixel in the optical flow field 300 have been evaluated (420).

Figure 7:
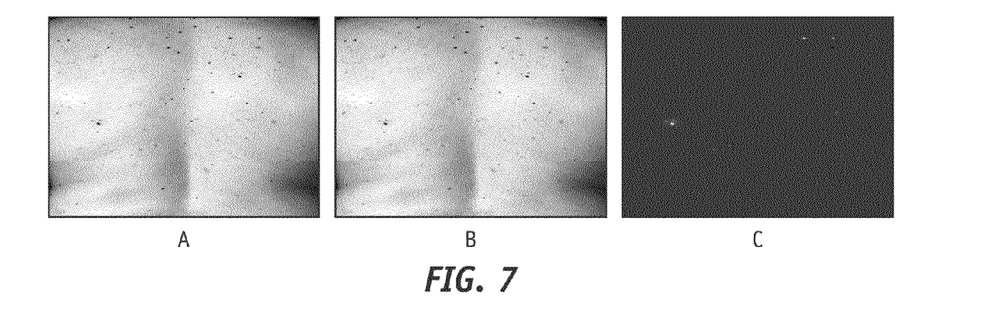
FIGS. 7A-C are the registered reference and test images and an image of the resultant anomalous (low feature regions.
Figure 8:
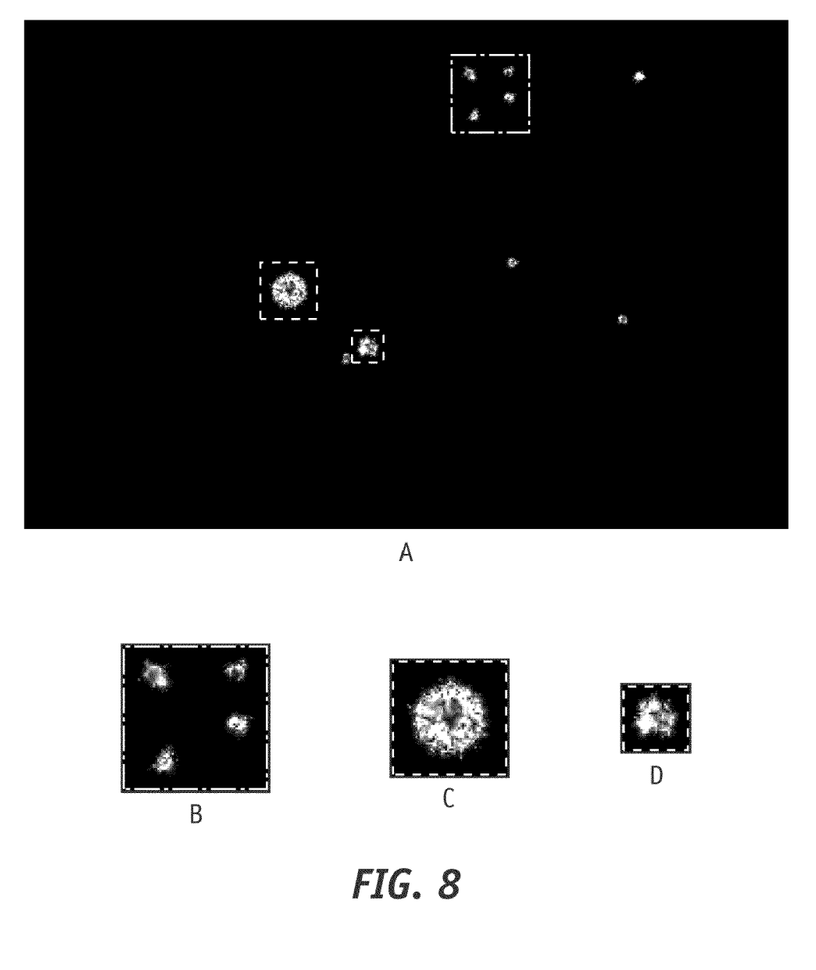
FIGS. 8A-D are examples of particular skin anomalies identified from the analysis of flow vector data.

The detection system 100 may also report the results of the analysis (422). In one embodiment, the report may be a visual image of the anomalous skin features identified as anomalies. For example, referring to FIGS. 7A-C, the report may be an image of anomalous regions on the skin as in FIG. 7C, identified from the analysis of the test image 212 and the reference image 210 (FIGS. 7A-B, respectively). Further, referring to FIG. 8, the report may highlight portions of the test image 212 that are associated with the anomalies identified in the statistical data, which may correspond to skin-related anomalies. Referring to FIGS. 8B-D, the report may further include additional information, such as detailed images of the skin features associated with the skin-related anomalies. In addition, the report may include locations and/or descriptions of the identified skin features. The location of the feature may comprise any method of describing a location, such as a measurement of the location of the skin feature using anatomical landmarks like shoulder blades and/or describing the features surrounding the area of the skin feature, such as moles and/or scars. The description of the skin feature may comprise the categorization of the skin feature, such as a new anomaly, a pre-existing anomaly that is absent, and/or a change in a pre-existing anomaly such as a change in color, shape, dimensions and/or the like.

The location and/or description of the skin feature may be reported in any number of suitable ways for access by the user, such as being stored in the memory of computer system 102 and/or as printed text. The reported location and/or description of the skin feature may be used by a physician to locate the anomalies on the patient's skin for individual examination (422).

The particular implementations shown and described are illustrative of the invention and its best mode and are not intended to otherwise limit the scope of the present invention in any way. Indeed, for the sake of brevity, conventional data processing, image acquisition, data transmission, and other functional aspects of the system (and components of the individual operating components of the systems) may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same. Likewise, the examples provided in the present description are merely examples, and the inclusion of such examples should not be regarded as limiting the scope of the disclosure. Instead, elements and systems illustrated by such examples should be construed, unless otherwise indicated, as including such possible implementations without being limited to any such possibilities.

We claim:

1. A detection system for detecting skin anomalies in an animal, comprising:
    an optical flow system adapted to:
        receive image data for a first image of an animal's skin and a second image of the animal's skin; and
        generate flow vectors corresponding to differences between the first image of the animal's skin and the second image of the animal's skin, wherein the flow vectors signify a relation between corresponding pixels in the first image and in the second image; and
    an analyzer coupled to the optical flow system and adapted to analyze the flow vectors to identify the skin anomalies in the second image, wherein the analyzer is configured to generate a signal for reporting the anomalies in the second image.

2. The detection system of claim 1, wherein the signal is an image of a region including the anomalies in the second image.

3. The detection system of claim 1, wherein the signal comprises at least one of the location of the anomaly within the flow vector data and a categorization of the anomaly.

4. The detection system of claim 1, further comprising a coarse registration system configured to perform a coarse registration to approximately align the first image and the second image to minimize differences therebetween, the coarse registration system to perform linear transformations of the second image with respect to the first image and generate coarsely-aligned images, and
    wherein the flow vectors are generated as part of a fine registration process that is performed based on results of the coarse registration, the fine registration process comprising performing an optical flow process on the coarsely-aligned images to generate the flow vectors.

5. A detection system for detecting skin anomalies in an animal, comprising:
    an optical flow system adapted to:
        receive image data for a first image of an animal's skin and a second image of the animal's skin; and
        generate flow vectors corresponding to differences between the first image of the animal's skin and the second image of the animal's skin;
    an analyzer coupled to the optical flow system and adapted to analyze the flow vectors to identify the skin anomalies in the second image;
    a coarse registration system configured to perform a coarse registration to approximately align the first image and the second image to minimize differences therebetween, the coarse registration system to perform linear transformations of the second image with respect to the first image and generate coarsely-aligned images, and
    wherein the flow vectors signify a relation between corresponding pixels in the first image and in the second image;
    wherein the analyzer is configured to generate a signal for reporting the anomalies in the second image;
    wherein the flow vectors are generated as part of a fine registration process that is performed based on results of the coarse registration, the fine registration process comprising performing an optical flow process on the coarsely-aligned images to generate the flow vectors;
    wherein the analyzer is configured analyze the flow vectors to identify anomalies and distinguish between flow vectors that relate to non-skin related conditions from flow vectors that relate to skin-related conditions by comparing magnitudes and directions of the flow vectors for regions around each pixel in the optical flow field based on pre-selected window size of a window of pixels and a comparison of the flow vectors to thresholds,
    wherein the non-skin related conditions comprise one or more of weight gain and loss, and
    wherein the skin-related conditions comprise one or more of mole, lesion, sore, and tumor.

6. The detection system of claim 5, wherein the analyzer coupled to the optical flow system is configured to generate statistics for measuring uniformity of a local flow across the pixels in the window to determine a presence of anomalies based on the flow vectors within the second image.

7. The detection system of claim 6, wherein the statistics include statistical values for one or more of mean magnitude, median magnitude, standard deviation of magnitudes, mean direction, median direction, standard deviation of direction of the flow vectors within the window, and
    wherein the statistical values are compared to thresholds based on standard deviations of the flow vectors.

8. The detection system of claim 7, wherein the analyzer is configured to calculate dynamic thresholds.

9. The detection system of claim 7, wherein the analyzer is configured to identify an outlier.

10. A detection system for detecting skin anomalies in an animal, comprising:
    an optical flow system; and
    an analyzer,
    wherein the optical flow system is configured to:
    receive image data for a first image of an animal's skin and a second image of the animal's skin;
    perform a coarse registration on the first and second images to align the images and minimize differences therebetween, the coarse registration comprising performance of linear transformations of the second image with respect to the first image; and
    perform a fine registration based on the coarse registration, the fine registration comprising performing an optical flow process on coarsely-aligned images, the optical flow process to generate flow vectors corresponding to differences between pixels of the first image and the second image, the flow vectors signifying where each pixel in the first image has moved in the second image, and
    wherein the analyzer is configured to analyze the flow vectors to identify the skin anomalies in the second image and to distinguish between flow vectors that relate to non-skin related conditions from flow vectors that relate to skin-related conditions by comparing magnitudes and directions of the flow vectors for regions around each pixel in the optical flow field based on pre-selected window size of a window of pixels.

11. The detection system of claim 10 wherein the analyzer is configured to calculate statistics for measuring uniformity of a local flow across the pixels in the window to determine the presence of anomalies based on the flow vectors within the second image, and wherein the statistics include statistical values for one or more of mean magnitude, median magnitude, standard deviation of magnitudes, mean direction, median direction, standard deviation of direction of the flow vectors within the window.

12. The detection system of claim 11 wherein the statistical values are compared to thresholds based on standard deviations of the flow vectors to identify skin-related anomalies.

13. The detection system of claim 12 wherein the non-skin related conditions comprise one or more of weight gain and loss, and wherein the skin-related conditions comprise one or more of mole, lesion, sore, and tumor.

* * * * *

UNITED STATES PATENT AND TRADEMARK OFFICE
CERTIFICATE OF CORRECTION

PATENT NO. : 8,337,405 B2
APPLICATION NO. : 12/135797
DATED : December 25, 2012
INVENTOR(S) : Waagen et al.

It is certified that error appears in the above-identified patent and that said Letters Patent is hereby corrected as shown below:

In the Drawings

Sheet 1 of 4, Fig. 1, reference numeral 108, line 1-2, delete "COMPUTER PROGRAM" and insert --IMAGING SYSTEM--, therefor In the Specification In column 2, line 24, delete "(low" and insert --flow--, therefor In column 2, line 53, delete "interlacing" and insert --interfacing,--, therefor In column 6, line 11, delete "(low" and insert --flow--, therefor In column 6, line 19, delete "overfilling" and insert --overfitting--, therefor In column 6, line 21, delete "(low" and insert --flow--, therefor In column 6, line 31, after "pixels", delete "between the", therefor In column 7, line 34, delete "$f_{i,j}$" and insert --$f_{i,j}$--, therefor In column 8, line 8, delete "(low" and insert --flow--, therefor

In column 9, line 1, delete "identity" and insert --identify--, therefor In column 9, line 6, delete "lime" and insert --time--, therefor In the Claims In column 12, line 13, in Claim 5, after "configured", insert --to--, therefor Signed and Sealed this
Tenth Day of December, 2013

Margaret A. Focarino
*Commissioner for Patents of the United States Patent and Trademark Office*